(12) United States Patent
Chang et al.

(10) Patent No.: US 11,953,803 B2
(45) Date of Patent: Apr. 9, 2024

(54) METHOD FOR CONTROLLING VOLTAGES OF LIQUID CRYSTAL ON SILICON TWO-DIMENSIONAL ARRAY AND RELATED DEVICE

(71) Applicant: HUAWEI TECHNOLOGIES CO., LTD., Guangdong (CN)

(72) Inventors: Zeshan Chang, Shenzhen (CN); Lei Mao, Dongguan (CN); Liangjia Zong, Dongguan (CN); Tong Li, Shenzhen (CN); Hong Yang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 155 days.

(21) Appl. No.: 17/681,097

(22) Filed: Feb. 25, 2022

(65) Prior Publication Data
US 2022/0179282 A1    Jun. 9, 2022

Related U.S. Application Data

(63) Continuation of application No. PCT/CN2020/100284, filed on Jul. 3, 2020.

(30) Foreign Application Priority Data

Aug. 29, 2019   (CN) .......................... 201910809762.9

(51) Int. Cl.
*G02F 1/31*   (2006.01)
*G09G 3/36*   (2006.01)

(52) U.S. Cl.
CPC ............. *G02F 1/31* (2013.01); *G09G 3/3611* (2013.01); *G09G 3/3659* (2013.01); *G02F 2202/10* (2013.01)

(58) Field of Classification Search
CPC ..... G02F 1/31; G02F 2202/10; G09G 3/3611; G09G 3/3659
See application file for complete search history.

(56) References Cited

U.S. PATENT DOCUMENTS 9,881,567 B2    1/2018  Wagener
2006/0284904 A1*  12/2006  Ng ........................ G09G 3/2092
                                                          345/691
(Continued)

FOREIGN PATENT DOCUMENTS

CN          101802902 A      8/2010
CN          104064135 A      9/2014
(Continued)

OTHER PUBLICATIONS

Jorge Garc a-M rquez, Victor L pez, Arturo Gonz lez-Vega, and Enrique No , "Flicker minimization in an LCoS spatial light modulator," Opt. Express 20, 8431-8441 (2012).

*Primary Examiner* — Abbas I Abdulselam
(74) *Attorney, Agent, or Firm* — WOMBLE BOND DICKINSON (US) LLP (57) ABSTRACT

Embodiments of the present application provide a method for controlling voltages of a liquid crystal on silicon (LCoS) two-dimensional array which includes a plurality of pixel sets, and the plurality of pixel sets include a first pixel set and a second pixel set. The method includes: determining a plurality of bit sequences, where the plurality of bit sequences include a first bit sequence and a second bit sequence; controlling a voltage of the first pixel set by using the first bit sequence; and controlling a voltage of the second pixel set by using the second bit sequence, where the first pixel set and the second pixel set are in different phase cycles in a port direction of the LCoS two-dimensional array, the first pixel set and the second pixel set have a same (Continued)

phase, and duty ratios of the first bit sequence and the second bit sequence are the same.

20 Claims, 8 Drawing Sheets (56) References Cited

U.S. PATENT DOCUMENTS

2007/0132695 A1* 6/2007 Kim .................... G09G 3/3611
345/98
2018/0294912 A1 10/2018 Fennema

FOREIGN PATENT DOCUMENTS

| CN | 105229945 | A | 1/2016 |
| CN | 106289527 | A | 1/2017 |
| CN | 107567644 | A | 1/2018 |
| CN | 109073898 | A | 12/2018 |
| CN | 109716186 | A | 5/2019 |
| JP | 2005128266 | A | 5/2005 |
| JP | 2018513417 | A | 5/2018 |
| WO | 2007029260 | A2 | 3/2007 |
| WO | 2009009416 | A2 | 1/2009 |
| WO | 2016168113 | A1 | 10/2016 |
| WO | 2018214173 | A1 | 11/2018 |
| WO | 2019061041 | A1 | 4/2019 |

* cited by examiner

Bit sequence A1: 1010 Flicker:

Bit sequence B1: 10101 Flicker:

Bit sequence C1: 01010 Flicker:

FIG. 11

Divide an LCoS into m pixel regions in a port direction, where m≥2, and each pixel region includes at least one phase cycle — 101

Apply different bit sequences to a same phase in different pixel regions — 102

METHOD FOR CONTROLLING VOLTAGES OF LIQUID CRYSTAL ON SILICON TWO-DIMENSIONAL ARRAY AND RELATED DEVICE

CROSS REFERENCE TO RELATED APPLICATIONS

This application is a continuation of International Application No. PCT/CN2020/100284, filed on Jul. 3, 2020, which claims priority to Chinese Patent Application No. 201910809762.9, filed on Aug. 29, 2019. The disclosures of the aforementioned applications are hereby incorporated by reference in their entireties.

TECHNICAL FIELD

This application relates to the field of optical communications, and in particular, to a method for reducing jitter of a liquid crystal on silicon two-dimensional array, a liquid crystal on silicon, a wavelength selective switch, and a ROADM device.

BACKGROUND

An optical wavelength selective switch based on a liquid crystal on silicon (LCoS) is one of core components of a wavelength selective switch (WSS), and can implement a wavelength crossing function. An important operation in implementing this function is modulating a two-dimensional array of an LCoS liquid crystal display. The LCoS includes millions of pixels. A main method for modulating the LCoS is to adjust phases of different pixels of the LCoS, and the phase of the pixel depends on a voltage loaded onto the pixel. When the LCoS operates in a digital drive mode, regular jitter of a drive voltage of the LCoS causes a phase of a pixel of the liquid crystal on silicon to jitter with time, and finally leads to degradation of an optical signal to noise ratio (OSNR) of a link. To reduce phase jitter of the pixel, different bit sequences may be selected to increase a voltage switching speed, or a plurality of bit sequences may be applied in a wavelength direction. Two bit sequences applied to two adjacent pixels cause drive voltages to have frequency components with opposite phases and equal magnitudes, so that jitter is reduced in a paired manner. That the voltage switching speed is increased and that different bit sequences are used for adjacent pixels in the wavelength direction may be used together. However, in the foregoing manner of reducing jitter, jitter of pixels in the wavelength direction is not synchronous. Therefore, jitter of different wavelengths in the system at the same time is not synchronous, causing an uneven filter spectrum and relatively high OSNR costs.

Therefore, how to reduce phase jitter of a pixel of a liquid crystal on silicon two-dimensional array while avoiding an uneven filter spectrum is an urgent technical problem to be resolved.

SUMMARY

Embodiments of this application provide a method for controlling voltages of a liquid crystal on silicon (LCoS) two-dimensional array, a liquid crystal on silicon, a wavelength selective switch, and a ROADM device, to effectively reduce phase jitter of a pixel of the LCoS two-dimensional array and ensure evenness of a filter spectrum, thereby avoiding degradation of an optical signal-to-noise ratio.

To achieve the foregoing objective, the embodiments of this application use the following technical solutions:

According to a first aspect, an embodiment of this application provides a method for controlling voltages of a liquid crystal on silicon (LCoS) two-dimensional array. The LCoS two-dimensional array includes a plurality of pixel sets, the plurality of pixel sets include a first pixel set and a second pixel set, and the method includes: determining a plurality of bit sequences, where the plurality of bit sequences include a first bit sequence and a second bit sequence; controlling a voltage of the first pixel set by using the first bit sequence; and controlling a voltage of the second pixel set by using the second bit sequence, where the first pixel set and the second pixel set are in different phase cycles in a port direction of the LCoS two-dimensional array, the first pixel set and the second pixel set have a same phase, and duty ratios of the first bit sequence and the second bit sequence are the same.

A pixel may be an electronic element, and the electronic element may include a panel, an electrode layer, and a liquid crystal layer. Different voltages are loaded onto a liquid crystal particle in the liquid crystal layer to implement different phase modulation on the pixel. The bit sequence may be a normalized representation of a voltage. For example, 1 in the bit sequence indicates that a high voltage is loaded, and 0 indicates that a low voltage is loaded. An effective voltage of the liquid crystal particle is implemented by using a high-voltage duty ratio and a low-voltage duty ratio. The LCoS two-dimensional array includes a wavelength direction and a port direction. The wavelength direction indicates that light spots of different wavelengths are scattered at different angles when being incident on a surface of a liquid crystal on silicon. The port direction indicates that signal output of a light spot of a particular wavelength at different ports is implemented based on different phases (or the light spot has different diffraction angles).

The phase cycle is a repeated cycle with a $2\pi$ (step change of phases of pixels in the port direction, and each phase cycle includes a plurality of phases ranging from 0 to $2\pi$. It should be noted that phases of adjacent pixels in the port direction are usually different. However, phases of two or more adjacent pixels in the port direction may be the same based on an actual requirement, and this is not limited in this embodiment of the application. It should be further noted that phases of adjacent pixels in the wavelength direction are usually the same. Therefore, the first pixel set and the second pixel set each may be a set with one pixel (or a plurality of pixels) in width (or in the port direction) and a plurality of pixels in length (or in the wavelength direction).

The duty ratio includes a high-voltage duty ratio and a low-voltage duty ratio, the high-voltage duty ratio is a ratio of duration of a bit of a high voltage to a total time, and the low-voltage duty ratio is a ratio of duration of a bit of a low voltage to the total time. It should be noted that an effective voltage $V_{rms}$ needs to be loaded onto a pixel by using the low-voltage duty ratio and the high-voltage duty ratio instead of directly providing a fixed value like an analog driver, where a sum of the high-voltage duty ratio and the low-voltage duty ratio is equal to 1. On the premise that a high voltage and a low voltage are determined, if the high-voltage (or low-voltage) duty ratio is different, an effective voltage loaded onto a liquid crystal particle is different. If the duty ratios of the first bit sequence and the second bit sequence are the same, effective voltages of the first pixel set and the second pixel set are the same, and further, phases of the first pixel set and the second pixel set are also the same.

In one embodiment, the plurality of pixel sets include a third pixel set and a fourth pixel set, the plurality of bit sequences include a third bit sequence, and the method includes: controlling voltages of the third pixel set and the fourth pixel set by using the third bit sequence, where the third pixel set and the fourth pixel set are adjacent pixel sets in a wavelength direction of the LCoS two-dimensional array. In this way, adjacent pixels in the wavelength direction use a same bit sequence, so that jitter of different wavelengths at the same time is synchronized, thereby ensuring evenness of a filter spectrum.

The third pixel set and the fourth pixel set are in a same phase cycle in the port direction, and phases of the third pixel set and the fourth pixel set are the same.

It should be noted that the third pixel set and the fourth pixel set may be pixel subsets in the first pixel set, or may be pixel subsets in the second pixel set.

In one embodiment, the first bit sequence and the second bit sequence have one or more complementary bits, and/or a quantity of bits of the first bit sequence and a quantity of bits of the second bit sequence are different.

In one embodiment, the first pixel set includes one or more pixels; and/or the second pixel set includes one or more pixels.

In one embodiment, the first pixel set includes one or more pixels in one phase cycle, or the first pixel set includes a plurality of pixels in a plurality of phase cycles, and when the first pixel set includes a plurality of pixels in a plurality of phase cycles, the plurality of pixels may not be adjacent; and/or the second pixel set includes one or more pixels in one phase cycle, or the second pixel set includes a plurality of pixels in a plurality of phase cycles, and when the second pixel set includes a plurality of pixels in a plurality of phase cycles, the plurality of pixels may not be adjacent.

In one embodiment, the third pixel set includes one or more pixels; and/or the fourth pixel set includes one or more pixels.

In one embodiment, the first bit sequence and the second bit sequence are preconfigured bit sequences, or the first bit sequence and the second bit sequence are bit sequences generated in real time.

In one embodiment, the third bit sequence is a preconfigured bit sequence, or the third bit sequence is a bit sequence generated in real time.

According to a second aspect, an embodiment of the application provides a liquid crystal on silicon. The liquid crystal on silicon may be configured to implement any method provided in any possible embodiment of the first aspect, and the liquid crystal on silicon includes:

a liquid crystal layer, where the liquid crystal layer includes a plurality of pixel sets, and the plurality of pixel sets include a first pixel set and a second pixel set; and a drive circuit, configured to determine a plurality of bit sequences, where the plurality of bit sequences include a first bit sequence and a second bit sequence; and further configured to control a voltage of the first pixel set by using the first bit sequence and control a voltage of the second pixel set by using the second bit sequence, where the first pixel set and the second pixel set are in different phase cycles in a port direction of an LCoS two-dimensional array, the first pixel set and the second pixel set have a same phase, and duty ratios of the first bit sequence and the second bit sequence are the same.

The liquid crystal on silicon is configured to achieve a phase modulation effect, and can independently control a diffraction and deflection direction of a beam incident on a surface of the liquid crystal on silicon.

The liquid crystal on silicon may further include a first panel, a second panel, and an alignment film. The first panel may be a silicon backplane, and the second panel may be a transparent glass substrate. The liquid crystal layer is located between the first panel and the second panel. Two alignment films are located on two opposite sides of the liquid crystal layer. In other words, one of the alignment films is located between the liquid crystal layer and the first panel, and the other of the alignment films is located between the liquid crystal layer and the second panel. The alignment film is configured to enable a liquid crystal in the liquid crystal layer to have an initial orientation.

In one embodiment, the drive circuit includes a first electrode layer and a second electrode layer. The first electrode layer is located between the liquid crystal layer and the first panel. The second electrode layer is located between the liquid crystal layer and the second panel. In one embodiment, the first electrode layer is formed on a side of the first panel facing the liquid crystal layer, the second electrode layer is formed on a side of the second panel facing the liquid crystal layer, and the two alignment films are located between the first electrode layer and the second electrode layer. When the first electrode layer and the second electrode layer are powered on, the liquid crystal in the liquid crystal layer is controlled, through vertically-aligned driving, to deflect.

In one embodiment, when a voltage is loaded onto the first electrode layer and the second electrode layer in the drive circuit by using a bit sequence, to generate an electric field between the first electrode layer and the second electrode layer, the liquid crystal in the liquid crystal layer deflects. In an embodiment, a liquid crystal major axis of the liquid crystal in the liquid crystal layer deflects from a direction substantially parallel to the first panel to a direction substantially perpendicular to the first panel. In another embodiment, a liquid crystal major axis in the liquid crystal layer may deflect from a direction substantially perpendicular to the first panel to a direction substantially parallel to the first panel. Because the liquid crystal is a birefringent material, liquid crystal deflection causes an equivalent refractive index change, so that a phase modulation effect is achieved. In addition, a deflection angle of a liquid crystal molecule is related to a magnitude of the voltage loaded onto the first electrode layer and the second electrode layer. Therefore, different phase modulation amounts may be achieved by loading different voltages.

In one embodiment, the plurality of pixel sets include a third pixel set and a fourth pixel set, the plurality of bit sequences include a third bit sequence, and the drive circuit is further configured to:

control voltages of the third pixel set and the fourth pixel set by using the third bit sequence, where the third pixel set and the fourth pixel set are adjacent pixel sets in a wavelength direction of the LCoS two-dimensional array. In this way, adjacent pixels in the wavelength direction use a same bit sequence, so that jitter of different wavelengths at the same time is synchronized, thereby ensuring evenness of a filter spectrum.

The third pixel set and the fourth pixel set are in a same phase cycle in the port direction, and phases of the third pixel set and the fourth pixel set are the same.

In one embodiment, the first bit sequence and the second bit sequence have one or more complementary bits, and/or a quantity of bits of the first bit sequence and a quantity of bits of the second bit sequence are different.

In one embodiment, the first pixel set includes one or more pixels; and/or the second pixel set includes one or more pixels.

In one embodiment, the first pixel set includes one or more pixels in one phase cycle, or the first pixel set includes a plurality of pixels in a plurality of phase cycles, and when the first pixel set includes a plurality of pixels in a plurality of phase cycles, the plurality of pixels may not be adjacent; and/or the second pixel set includes one or more pixels in one phase cycle, or the second pixel set includes a plurality of pixels in a plurality of phase cycles, and when the second pixel set includes a plurality of pixels in a plurality of phase cycles, the plurality of pixels may not be adjacent.

In one embodiment, the third pixel set includes one or more pixels; and/or the fourth pixel set includes one or more pixels.

In one embodiment, the first bit sequence and the second bit sequence are preconfigured bit sequences, or the first bit sequence and the second bit sequence are bit sequences generated in real time.

In one embodiment, the third bit sequence is a preconfigured bit sequence, or the third bit sequence is a bit sequence generated in real time.

According to a third aspect, an embodiment of the application provides a wavelength selective switch. The wavelength selective switch includes at least one input port and at least one output port corresponding to the input port, a wavelength division multiplexing unit, and the liquid crystal on silicon according to the second aspect. The input port is configured to receive an input beam, which may be output at different output ports after wavelength crossing. The wavelength division multiplexing unit may be configured to scatter wavelengths at different angles, and then another component (for example, a lens) converts scattered beams into parallel beams for being incident on different positions of the liquid crystal on silicon. The liquid crystal on silicon performs optical output on different wavelength components in a port direction.

In one embodiment, the wavelength selective switch further includes a polarization conversion unit, the lens, a reflector, and the like. The polarization conversion unit may be configured to convert the input beam into linearly polarized light corresponding to a working polarization state of the liquid crystal on silicon. The lens may be configured to convert the scattered beams into the parallel beams for being incident on different positions of the liquid crystal on silicon. The reflector is configured to reflect light. The wavelength division multiplexing unit may be a diffraction grating.

In one embodiment, in addition to the foregoing structural units, the wavelength selective switch may include a controller or a processor, configured to selectively configure a bit sequence to drive a pixel in the liquid crystal on silicon, to control optical output in the port direction. The controller or the processor may be implemented by hardware, software, firmware, or any combination thereof. For example, the controller or the processor may be one or more processors, digital signal processors, application-specific integrated circuits, field programmable gate arrays, discrete logic, or any combination thereof. When the controller or the processor is partially implemented by software, the device may store computer executable instructions for software in a suitable and non-transient computer-readable storage medium and may use one or more processors in hardware to execute instructions to run the technical solutions of the application.

According to a fourth aspect, an embodiment of this application provides a ROADM device, including:

a local add/drop module, configured to implement wavelength adding/dropping between a client-side direction and a line-side direction; and a wavelength crossing module, including one or more wavelength selective switches according to the third aspect, and configured to implement wavelength selection between the client-side direction and the line-side direction.

DESCRIPTION OF DRAWINGS

To describe the technical solutions in the embodiments of the application more clearly, the following briefly describes the accompanying drawings required for describing the embodiments or the prior art. Clearly, the accompanying drawings in the following description merely show some embodiments of the application, and a person of ordinary skill in the art can derive other embodiments from these accompanying drawings without creative efforts. All these embodiments or implementations shall fall within the protection scope of the application.

DESCRIPTION OF EMBODIMENTS

To make the objectives, technical solutions, and advantages of this application clearer, the following further describes this application in detail with reference to the accompanying drawings. A operation method in method embodiments may also be applied to an apparatus embodiment or a system embodiment.

Figure 1:
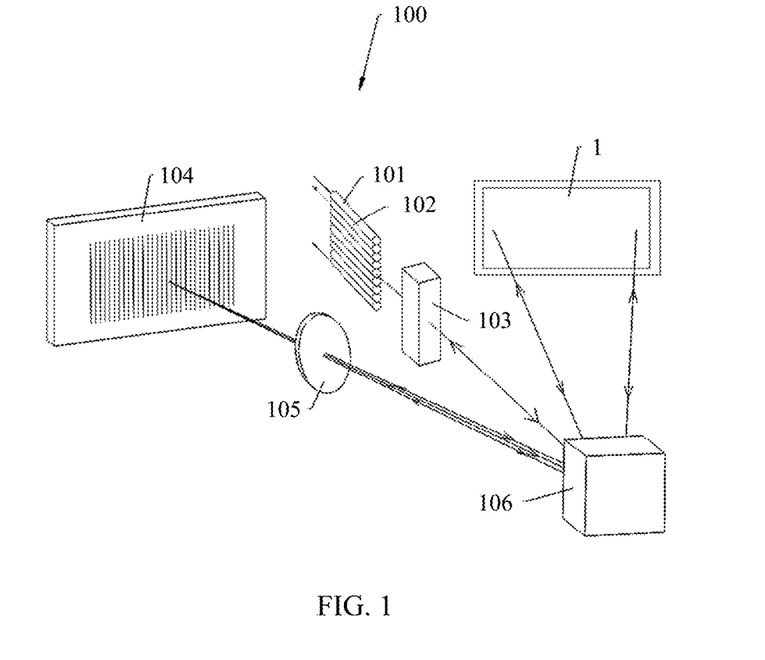
FIG. 1 is a schematic structural diagram of a wavelength selective switch applicable to the embodiments of this application.

FIG. 1 is a schematic structural diagram of a wavelength selective switch (WSS) 100 applicable to the embodiments of this application. The wavelength selective switch 100 may be applied to a ROADM (reconfigurable optical add/drop multiplexer). The wavelength selective switch 100 includes a liquid crystal on silicon 1, and the liquid crystal on silicon (LCoS) 1 is used as an optical switching engine of the wavelength selective switch 100 to achieve a phase modulation effect, to independently control diffraction and deflection directions of light beams incident on different regions of the liquid crystal on silicon 1.

The wavelength selective switch 100 may further include at least one input port 101 (for example, an input fiber), at least one output port group corresponding to the input port 101, a polarization conversion unit 103, a wavelength division multiplexer 104 (for example, a diffraction grating), and a lens 105. Each output port group includes at least two output ports 102 (for example, output fibers). As shown in FIG. 1, all beam transmission paths in the figure are reversible paths. A multi-wavelength signal forms an input beam through the input port 101. The input beam is converted by the polarization conversion unit 103 into linearly polarized light corresponding to a working polarization state of the liquid crystal on silicon 1. The linearly polarized light is incident on the wavelength division multiplexer 104, the wavelength division multiplexer 104 scatters wavelengths at different angles, and then the lens 105 converts scattered light beams into parallel light beams for being incident on different positions of the liquid crystal on silicon 1. Light beams of different wavelengths are focused on different regions of the liquid crystal on silicon 1, and are diffracted and deflect, the diffracted light beam is restored to the original polarization state by using the polarization conversion unit 103, and light beams of different wavelengths are coupled to respective target output ports 102. Because respective diffraction and deflection directions of light beams of different wavelengths are controlled by different regions of the liquid crystal on silicon 1, the liquid crystal on silicon 1 can switch any wavelength combination to any one of the output ports 102. The wavelength selective switch 100 further includes a reflector 106, and the reflector 106 is configured to reflect light.

In addition to the foregoing structural units, the wavelength selective switch may include a controller or a processor, configured to selectively configure a bit sequence to drive a pixel in the liquid crystal on silicon, to control optical output in the port direction. The controller or the processor may be implemented by hardware, software, firmware, or any combination thereof. For example, the controller or the processor may be one or more processors, digital signal processors, application-specific integrated circuits, field programmable gate arrays, discrete logic, or any combination thereof. When the controller or the processor is partially implemented by software, the device may store computer executable instructions for software in a suitable and non-transient computer-readable storage medium and may use one or more processors in hardware to execute instructions to run the technical solutions of the application.

Figure 2:
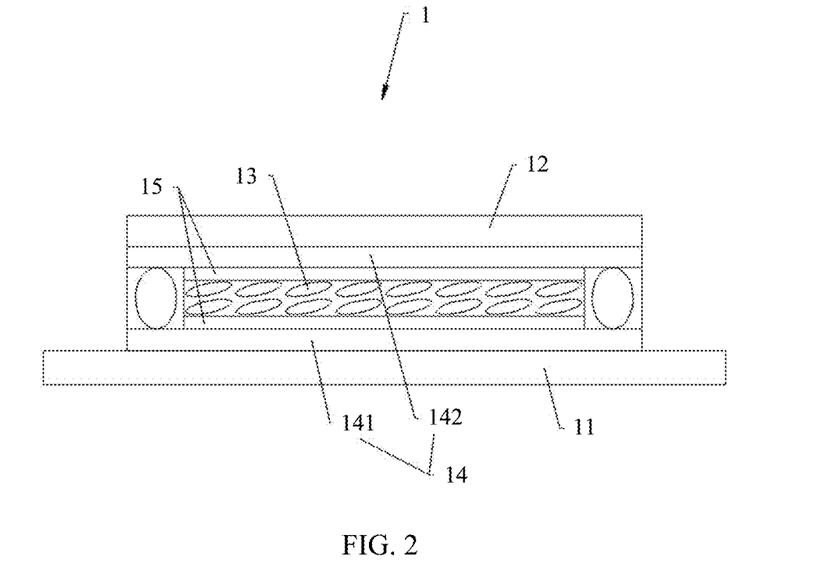
FIG. 2 is a schematic structural diagram of a liquid crystal on silicon of the wavelength selective switch shown in FIG. 1.

FIG. 2 is a schematic diagram of a physical structure of the foregoing liquid crystal on silicon. The liquid crystal on silicon may be applied to the wavelength selective switch 100. The liquid crystal on silicon 1 is configured to diffract an incident light beam in a linear polarization state to form a deflected beam. The liquid crystal on silicon 1 is a polarization-sensitive component, and can work in only one polarization direction (namely, a working polarization direction). A polarization direction of the incident light beam is the working polarization direction of the liquid crystal on silicon 1. The liquid crystal on silicon 1 includes a first panel 11, a second panel 12, a liquid crystal layer 13, a drive circuit 14, and two alignment films 15. The first panel 11 is disposed opposite to the second panel 12. The first panel 11 is parallel to the second panel 12. The first panel 11 may be a silicon backplane, and the second panel 12 may be a transparent glass substrate. The liquid crystal layer 13 is located between the first panel 11 and the second panel 12, and includes many liquid crystal molecules. The liquid crystal molecules deflect when a voltage is loaded onto an electrode layer. The drive circuit 14 is configured to generate an electric field to control a liquid crystal in the liquid crystal layer 13 to deflect. The two alignment films 15 are located on two opposite sides of the liquid crystal layer 13. In other words, one of the alignment films 15 is located between the liquid crystal layer 13 and the first panel 11, and the other of the alignment films 15 is located between the liquid crystal layer 13 and the second panel 12. The alignment film 15 is configured to enable the liquid crystal in the liquid crystal layer 13 to have an initial orientation.

For example, the drive circuit 14 includes a first electrode layer 141 and a second electrode layer 142. The first electrode layer 141 is located between the liquid crystal layer 13 and the first panel 11. The second electrode layer 142 is located between the liquid crystal layer 13 and the second panel 12. In one embodiment, the first electrode layer 141 is formed on a side of the first panel 11 facing the liquid crystal layer 13, the second electrode layer 142 is formed on a side of the second panel 12 facing the liquid crystal layer 13, and the two alignment films 15 are located between the first electrode layer 141 and the second electrode layer 142. When the first electrode layer 141 and the second electrode layer 142 are powered on, the liquid crystal in the liquid crystal layer 13 is controlled, through vertically-aligned (VA) driving, to deflect.

Figure 3:
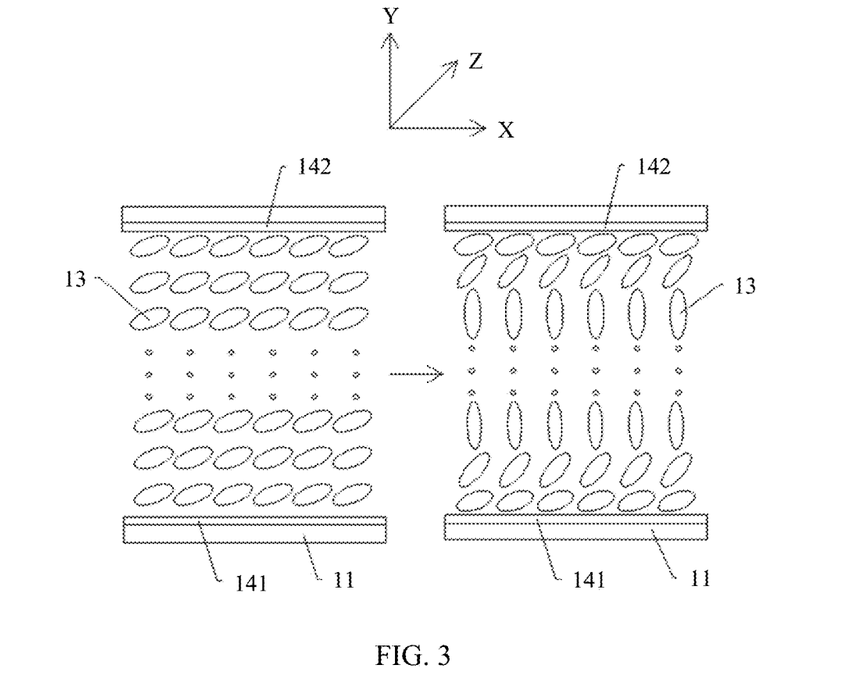
FIG. 3 is a schematic diagram of rotation of a liquid crystal in the liquid crystal on silicon shown in FIG. 2.

With reference to FIG. 2 and FIG. 3, when a voltage is loaded onto the first electrode layer 141 and the second electrode layer 142 to generate an electric field between the first electrode layer 141 and the second electrode layer 142, the liquid crystal in the liquid crystal layer 13 deflects (a deflection plane is an XY plane in FIG. 3, that is, a plane perpendicular to the first panel 11). X represents a wavelength direction, Y represents a phase cycle $2n$, and Z represents a port direction. For example, the liquid crystal in the liquid crystal layer 13 deflects from a state of a left figure in FIG. 3 to a state of a right figure in FIG. 3, in other words, a liquid crystal major axis deflects from a direction substantially parallel to the first panel 11 to a direction substantially perpendicular to the first panel 11. This is used as an example for description in this application. In another embodiment, a liquid crystal major axis in the liquid crystal layer 13 may deflect from a direction substantially perpendicular to the first panel 11 to a direction substantially parallel to the first panel 11. Because the liquid crystal is a birefringent material, liquid crystal deflection causes an equivalent refractive index change, so that a phase modulation effect is achieved. In addition, a deflection angle of a liquid crystal molecule is related to a magnitude of the voltage loaded onto the first electrode layer 141 and the second electrode layer 142. Therefore, different phase modulation amounts may be achieved by loading different voltages. This is a principle of performing phase modulation on a pixel in a liquid crystal on silicon two-dimensional array.

Figure 4:
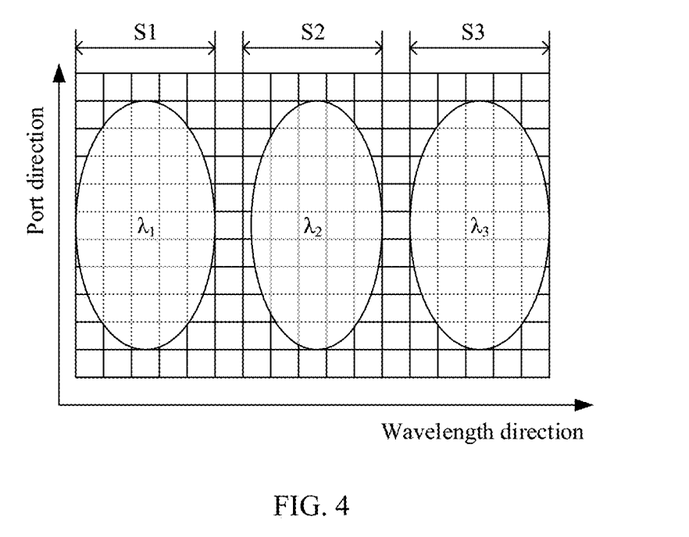
FIG. 4 is a schematic diagram of arrangement of incident light beams on an LCoS two-dimensional array.
Figure 5:
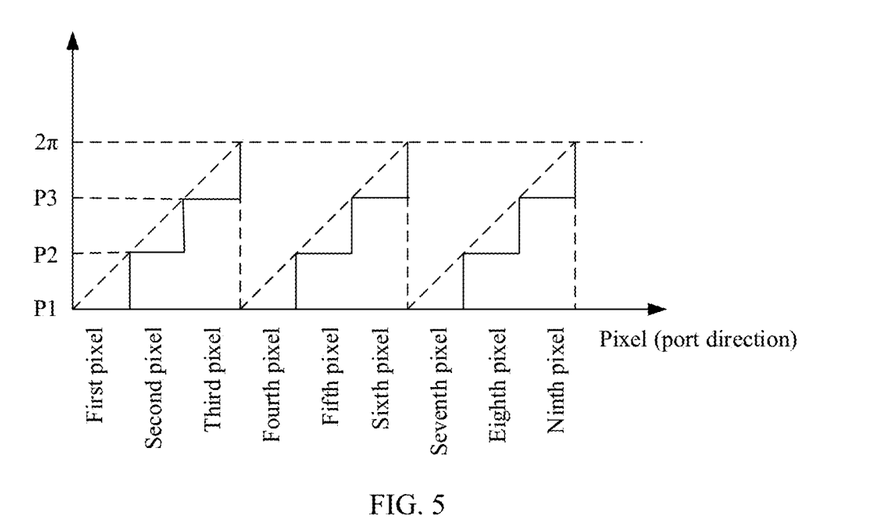
FIG. 5 is a schematic diagram of a relationship between a phase cycle, a phase, and a pixel in a port direction.

FIG. 4 is a schematic diagram of arrangement of incident light beams on an LCoS two-dimensional array. The LCoS two-dimensional array includes a wavelength direction and a port direction. The wavelength direction indicates that light spots of different wavelengths are scattered at different angles when being incident on a surface of the liquid crystal on silicon 1. The port direction indicates that signal output of a light spot of a particular wavelength at different ports is implemented based on different phases (or the light spot has different diffraction angles). As shown in FIG. 4, the LCoS includes millions of pixels, and the pixel may be an electronic element. The electronic element may include the panels, the electrode layers, and the liquid crystal layer shown in FIG. 3. A phase of the pixel may be controlled by loading different voltages onto a liquid crystal particle in the liquid crystal layer. When a light spot is incident on the surface of the LCoS, light spots of different wavelength channels (for example, $\lambda_1$, $\lambda_2$, and $\lambda_3$) are arranged in the wavelength direction of a liquid crystal plane. In one embodiment, a wavelength channel corresponding to an incident light beam $\lambda_1$ occupies a pixel in a region B1, a wavelength channel corresponding to an incident light beam $\lambda_2$ occupies a pixel in a region B2, a wavelength channel corresponding to an incident light beam $\lambda_3$ occupies a pixel in a region B3, and wavelengths of the incident light beams $\lambda_1$, $\lambda_2$, and $\lambda_3$ are different from each other. When a drive voltage is loaded onto a drive circuit, because drive voltages of pixels in a region that are occupied by a particular wavelength channel are different in the port direction, the different drive voltages cause phases of the pixels in the port direction to be in a cycle with a $2\pi$ step change. As shown in FIG. 5, for example, the pixels in the port direction have a total of three phases P1, P2, and P3, and periodic arrangement with a step change is presented. Phases of a first pixel, a fourth pixel, and a seventh pixel are P1, phases of a second pixel, a fifth pixel, and an eighth pixel are P2, and phases of a third pixel, a sixth pixel, and a ninth pixel are P3. One phase cycle includes three pixels. A first phase cycle includes phases of the first pixel, the second pixel, and the third pixel, a second phase cycle includes phases of the fourth pixel, the fifth pixel, and the sixth pixel, and a third phase cycle includes phases of the seventh pixel, the eighth pixel, and the ninth pixel. It should be noted that a correspondence between pixels and phases in FIG. 5 is merely an example, each phase cycle may include many different phases, and phases of adjacent pixels may also be the same. This is not limited in the application. It should be further noted that light spots of different wavelengths are not fully independently distributed in the LCoS two-dimensional array, the light spots of the wavelengths often overlap each other, and a same pixel may include light spots of a plurality of wavelengths.

Figure 6:
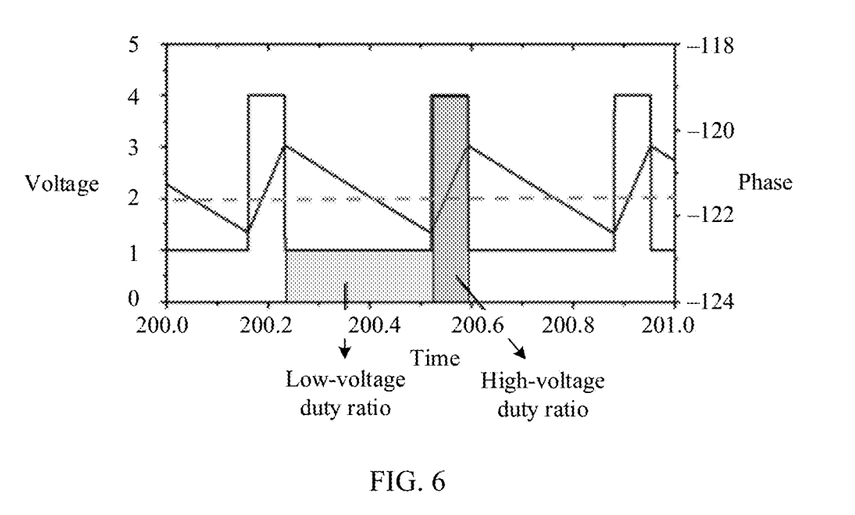
FIG. 6 is a schematic diagram of a reason for jitter of a pixel in a liquid crystal on silicon array.
Figure 7:
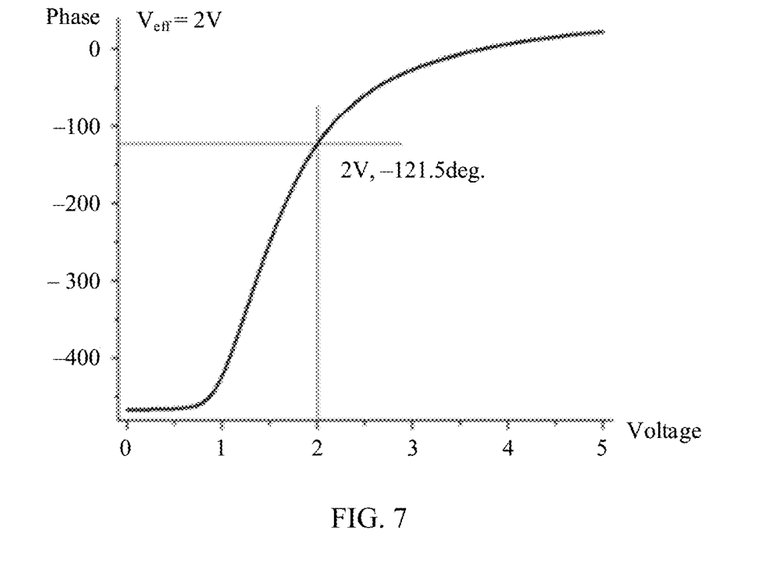
FIG. 7 is a schematic diagram of a relationship between a voltage loaded onto a pixel in a liquid crystal on silicon array and a phase of the pixel.

FIG. 6 and FIG. 7 are schematic diagrams of a reason for phase jitter of a pixel in a liquid crystal on silicon array. As shown in FIG. 6, an effective voltage $V_{rms}$ needs to be loaded onto a pixel by using duty ratios of two voltages (a low voltage $V_L$, and a high voltage $V_H$) instead of directly providing a fixed value like an analog driver. For example, in FIG. 6, the high voltage $V_H$ is 4V, and the low voltage $V_L$, is 1V. To obtain an output voltage (namely, the effective voltage $V_{rms}$) 2V, the high-voltage duty ratio DutyRatio is 0.2 and the low-voltage duty ratio is 0.8 according to a formula $V_{rms}=\sqrt{V_L^2*(1-\text{DutyRatio})+V_H^2*\text{DutyRatio}}$. It should be noted that a sum of the high-voltage duty ratio and the low-voltage duty ratio is equal to 1. There is a one-to-one correspondence between drive voltages loaded onto pixels of a liquid crystal on silicon and phases of the pixels. In one embodiment, different drive voltages loaded onto pixels determine different phases of the pixels. For details of a relationship between phases and drive voltages, refer to FIG. 7. The effective voltage is formed by using the duty ratios of the high voltage $V_H$ and the low voltage $V_L$ in terms of time. In other words, when the effective voltage $V_{rms}$ remains unchanged, a voltage loaded onto both ends of a liquid crystal particle always switches between a high voltage and a low voltage. Because a switching speed cannot be totally greater than a response speed of a liquid crystal, a phase of a pixel also changes with the switching between a high voltage and a low voltage. As shown in FIG. 6, a final reflection is that a phase of a pixel of the liquid crystal regularly jitters with time. Such jitter may also be referred to as flicker.

Jitter is an important parameter that affects an optical signal-to-noise ratio of a link. As jitter amplitude increases, the optical signal-to-noise ratio degrades accordingly. If a plurality of wavelength selective switches are cascaded, the optical signal-to-noise ratio degrades exponentially.

Figure 8:
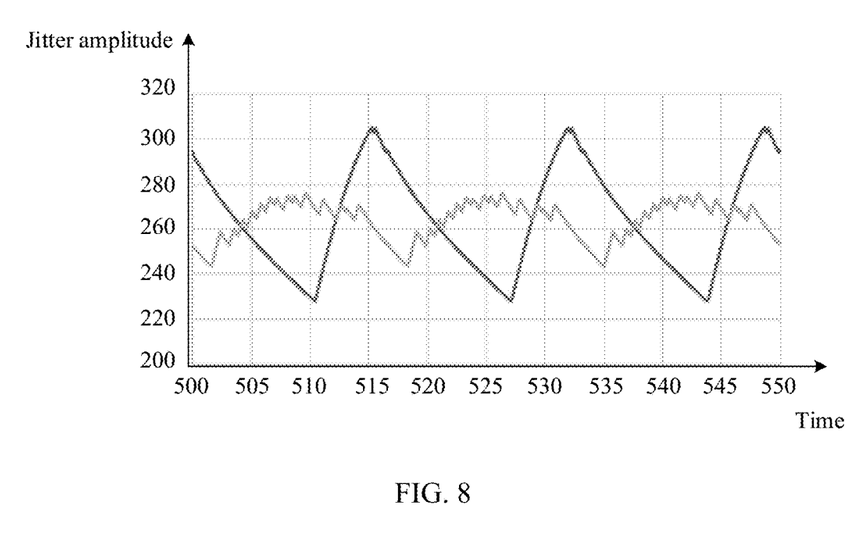
FIG. 8 is a schematic diagram of phase jitter generated by different bit sequences.
Figure 9:
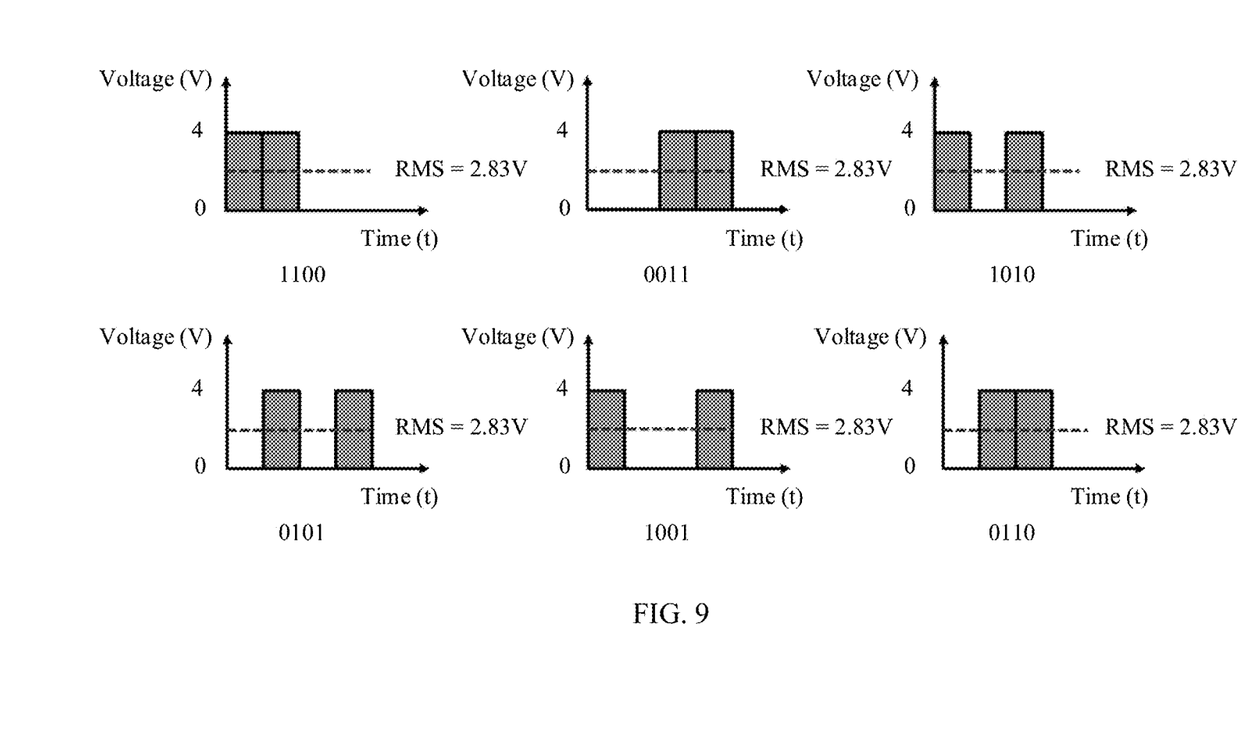
FIG. 9 is a schematic diagram of different bit sequences with a same duty ratio.

FIG. 8 is a schematic diagram of phase jitter generated by different bit sequences. It may be understood that a same duty ratio may also have different bit composition manners, referred to as bit sequences, and the bit sequence may drive generation of a voltage signal, and is a normalized representation of the voltage signal. For example, it is assumed that a low voltage is 0V and is indicated by 0 in a bit sequence, and a high voltage is 4V and is indicated by 1 in the bit sequence. For ease of description, in this embodiment, 4 bits are used to implement conversion between the high voltage and the low voltage and output of an effective voltage. When both a high-voltage duty ratio and a low-voltage duty ratio are 50%, the effective voltage is 2.83V according to the foregoing formula $V_{rms}=\sqrt{V_L^2*(1-\text{DutyRatio})+V_H^2*\text{DutyRatio}}$. A high voltage and a low voltage each occupy 2 bits. In this case, there are six bit sequences: 1100, 0011, 1010, 0101, 1001, and 0110. Referring to FIG. 9, switching speeds between the high voltage and the low voltage in the six bit sequences are different. In the two bit sequences 1010 and 0101, the high voltage and the low voltage are alternate, voltages of adjacent bits are different, and voltage switching speeds are higher than voltage switching speeds of the bit sequences 1100, 0011, 1001, and 0110. FIG. 8 shows amplitude of phase jitter generated by two types of bit sequences. Phase jitter indicated by a dark line is generated by the bit sequences 1100, 0011, 1001, and 0110, and phase jitter of a light line is generated by the bit sequences 1010 and 0101. It is clear through comparison that a higher switching speed between the high voltage and the lower voltage indicates smaller amplitude of generated phase jitter.

Figure 10A:
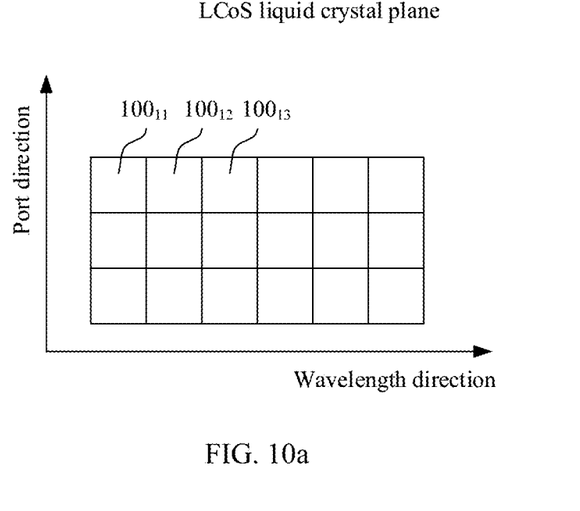
FIG. 10a is a schematic diagram of a two-dimensional plane in which different bit sequences are applied to adjacent pixels in a wavelength direction.
Figure 10B:
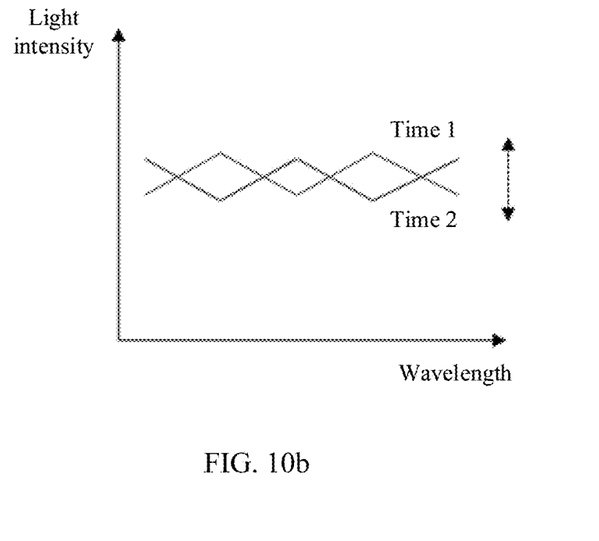
FIG. 10b is a schematic diagram of jitter of different wavelengths at the same time.

FIG. 10a and FIG. 10b are schematic diagrams in which different wavelengths jitter with time when different bit sequences are used in a wavelength direction. Currently, voltages loaded onto adjacent pixels in the wavelength direction are usually controlled by using different bit sequences. As shown in FIG. 10a, a pixel 100 extends along a row of an x-axis and a column of a y-axis in a plan view of an LCoS. The x-axis represents the wavelength direction, and the y-axis represents a port direction. It may be understood that, as an example, phases of adjacent pixels in one row and a plurality of rows (or one column or a plurality of columns) in the wavelength direction are the same. As shown in FIG. 10a, two adjacent pixels $100_{11}$ and $100_{12}$ use different bit sequences in the wavelength direction, where a bit sequence used by the pixel $100_{11}$ is 1010, and a bit sequence used by the pixel $100_{12}$ is 0101. Because drive voltages of adjacent pixels in the wavelength direction at the same time are not synchronous, jitter of different wavelengths in the system at the same time is not synchronous, either. As shown in FIG. 10b, a horizontal axis is the wavelength direction, a vertical axis is light intensity of a light spot of a particular wavelength, time 1 indicates jitter of light spots of different wavelength at a moment time 1, and time 2 indicates jitter of light spots of different wavelengths at a moment time 2. It can be learned that jitter of different wavelengths at the same time is different. This finally causes an uneven filter spectrum and relatively high OSNR costs. In the embodiments of the application, different bit sequences are applied to pixels of a same phase in the port direction, and a same bit sequence is applied to pixels of a same phase in the wavelength direction (or adjacent pixels in the wavelength direction), so that jitter of different wavelengths at the same time can be synchronized, thereby effectively avoiding an uneven filter spectrum. For a solution, refer to FIG. 11.

Figure 11:
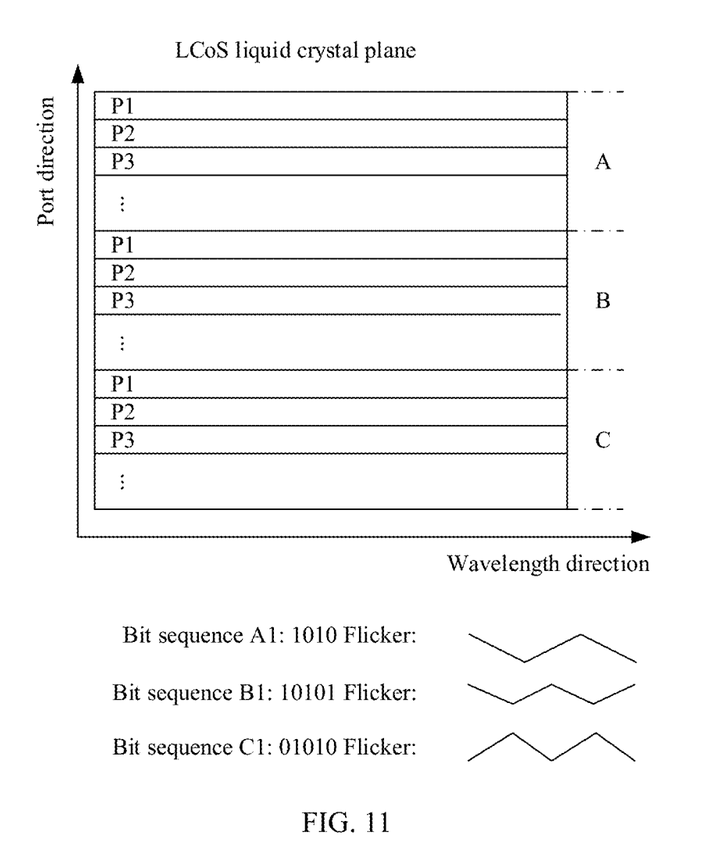
FIG. 11 is a schematic plan view of a two-dimensional array for reducing phase jitter according to an embodiment of the application.

FIG. 11 is a schematic plan view of a liquid crystal on silicon two-dimensional array for reducing jitter applicable to the embodiments of this application. As shown in FIG. 11, for example, in a two-dimensional array plane of a liquid crystal on silicon, there are three pixel regions A, B, and C in a port direction, each pixel region includes at least one phase cycle, and each phase cycle includes three phases P1, P2, and P3. Different bit sequences are applied to pixels of a same phase in the pixel regions, for example, pixels of the phase P1 in the pixel region A, the pixel region B, and the pixel region C, to drive voltage signals, so that phase jitter is mutually cancelled and suppressed. In one embodiment, a bit sequence A1 is applied to a pixel of the phase P1 in a particular phase cycle in the pixel region A, a bit sequence B1 is applied to a pixel of the phase P1 in a particular phase cycle in the pixel region B, and a bit sequence C1 is applied to a pixel of the phase P1 in a particular phase cycle in the pixel region C. In the embodiments of the application, quantities of bits of the bit sequence A1, B1, and C1 are not limited, provided that it is ensured that jitter generated by the three bit sequences is different. As shown in FIG. 11, the bit sequence A1 is 1010, the bit sequence B1 is 10101, the bit sequence C1 is 01010, and phase jitter generated by voltage signals driven by the bit sequences A1, B1, and C1 is different, and may be partially cancelled. In one embodiment, in the port direction, when phase jitter of the pixels to which the bit sequences A1 and B1 are applied is a peak value, phase jitter of the pixel to which the bit sequence C1 is applied is exactly a valley value, and can partially cancel the phase jitter of the pixels to which the bit sequences A1 and B1 are applied; when phase jitter of the pixel to which the bit sequence A1 is applied is a valley value, phase jitter of the pixels to which the bit sequences B1 and C1 are applied falls between a peak value and a valley value, and can partially cancel the phase jitter of the pixel to which the bit sequence A1 is applied. FIG. 11 is only an example of a bit sequence. It should be understood that if bit sequences applied to pixels of a same phase in different pixel regions are exactly complementary, a phase jitter effect of a pixel is lower, and quite small phase jitter is finally presented. For example, when each pixel region includes two or more phase cycles, a same bit sequence may be applied to a same phase in different phase cycles in a same pixel region. For example, if the pixel region A includes two phase cycles, which are a first phase cycle and a second phase cycle, and the first phase cycle and the second phase cycle each include three phases P1, P2, and P3, the bit sequence A1 is applied to a pixel of the phase P1 in the first phase cycle, and the bit sequence A1 is also applied to a pixel of the phase P1 in the second phase cycle. It should be noted that voltages of pixels of the phases P1, P2, and P3 are different (the phase depends on the voltage), and bit sequences implemented as normalized voltages are naturally different.

In one embodiment, each pixel region may include only one phase cycle, and a pixel sub-region such as P1 of a same phase in one phase cycle may include one pixel or a plurality of pixels in the port direction, and may include at least two pixels in a wavelength direction. In the embodiments of the application, different bit sequences are applied to pixels of a same phase in different pixel regions in the port direction, so that a phase jitter superposition effect can be suppressed. In addition, a same bit sequence is applied to pixels of a same phase in the wavelength direction, so that jitter in the wavelength direction is synchronized, thereby effectively avoiding an uneven filter spectrum caused by a difference between jitter of different wavelengths at the same time and avoiding extra OSNR costs.

Figure 12:
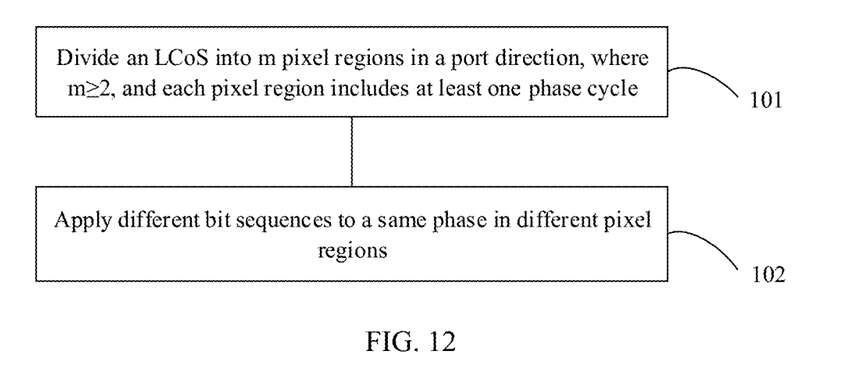
FIG. 12 is a flowchart of a method for reducing phase jitter according to an embodiment of the application.

FIG. 12 is a flowchart of a method for reducing phase jitter according to an embodiment of the application. The method is applicable to an LCoS-based optical crossing component. The method includes the following operations.

S101: Divide an LCoS into m pixel regions in a port direction, where $m \geq 2$, and each pixel region includes at least one phase cycle.

In this embodiment, the LCoS is divided into at least two pixel regions in the port direction, which are defined as a first pixel region, a second pixel region, ..., and an $m^{th}$ pixel region. Each pixel region includes at least one phase cycle, and each phase cycle may include a plurality of phases such as P1, P2, and P3. A pixel sub-region such as P1 of each phase may include only one pixel or a plurality of pixels in the port direction, and include at least two pixels in a wavelength direction.

It should be noted that quantities of pixels and quantities of phase cycles included in all the pixel regions may be different, and this is not limited in this embodiment.

S102: Apply different bit sequences to a same phase in different pixel regions.

In this embodiment, for example, the LCoS may be divided into three pixel regions in the port direction, which are a first pixel region, a second pixel region, and a third pixel region. Each pixel region includes at least one phase cycle, and each phase cycle includes a plurality of phases. Different bit sequences are applied to pixels of a same phase in all the pixel regions, to drive voltage signals, so that phase jitter is mutually cancelled and suppressed.

In one embodiment, as shown in FIG. 11, a bit sequence A1 is applied to a pixel of a phase P1 in a particular phase cycle in a pixel region A, a bit sequence B1 is applied to a pixel of the phase P1 in a particular phase cycle in a pixel region B, and a bit sequence C1 is applied to a pixel of the phase P1 in a particular phase cycle in a pixel region C. In the embodiments of the application, quantities of bits of the bit sequence A1, B1, and C1 are not limited, provided that it is ensured that jitter generated by the three bit sequences is different. For example, the bit sequence A1 is 1010, the bit sequence B1 is 10101, the bit sequence C1 is 01010, and phase jitter generated by voltage signals driven by the bit sequences A1, B1, and C1 is different, and may be partially cancelled. In one embodiment, in the port direction, when phase jitter of the pixels to which the bit sequences A1 and B1 are applied is a peak value, phase jitter of the pixel to which the bit sequence C1 is applied is exactly a valley value, and can partially cancel the phase jitter of the pixels to which the bit sequences A1 and B1 are applied; when phase jitter of the pixel to which the bit sequence A1 is applied is a valley value, phase jitter of the pixels to which the bit sequences B1 and C1 are applied falls between a peak value and a valley value, and can partially cancel the phase jitter of the pixel to which the bit sequence A1 is applied. FIG. 11 is only an example of a bit sequence. It should be understood that if bit sequences applied to pixels of a same phase in different pixel regions are exactly complementary, a phase jitter effect of a pixel is lower, and quite small phase jitter is finally presented.

For example, when each pixel region includes two or more phase cycles, a same bit sequence may be applied to a same phase in different phase cycles in a same pixel region. For example, if the pixel region A includes two phase cycles, which are a first phase cycle and a second phase cycle, and the first phase cycle and the second phase cycle each include three phases P1, P2, and P3, the bit sequence A1 is applied to a pixel of the phase P1 in the first phase cycle, and the bit sequence A1 is also applied to a pixel of the phase P1 in the second phase cycle.

In one embodiment, each pixel region may include only one phase cycle, and a pixel sub-region such as P1 of a same phase in one phase cycle may include one pixel or a plurality of pixels in the port direction, and may include at least two pixels in the wavelength direction. In the embodiments of the application, different bit sequences are applied to pixels of a same phase in different pixel regions in the port direction, so that a phase jitter superposition effect can be suppressed. In addition, a same bit sequence is applied to pixels of a same phase in the wavelength direction, so that jitter in the wavelength direction is synchronized, thereby effectively avoiding an uneven filter spectrum caused by a difference between jitter of different wavelengths at the same time and avoiding extra OSNR costs.

Figure 13:
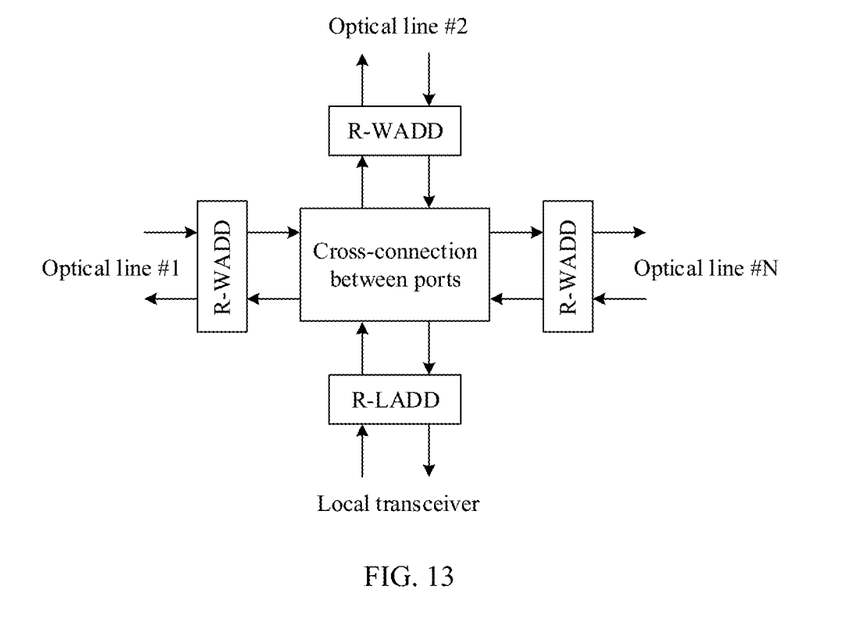
FIG. 13 is a schematic structural diagram of a ROADM device applicable to the embodiments of the application.

FIG. 13 is a schematic diagram of a ROADM device applicable to the embodiments of the application. A typical ROADM device of C (colorless), D (directionless), and C (contention less) includes a line-side module and a client-side module. As shown in FIG. 13, two basic function modules included in the ROADM device are a reconfigurable wavelength add/drop (crossing) device (R-WADD), serving as a line-side module, and configured to transmit any wavelength channel from one optical line direction to another line direction; and a reconfigurable local add/drop device (R-LADD), serving as a client-side module, and configured to drop a wavelength of any line direction and add a local wavelength to any line direction. The R-WADD has a wavelength selection function, and is obtained through stacking and interconnection of a plurality of wavelength selective switch modules.

The foregoing mainly describes the solutions provided in the embodiments of this application from the perspective of the method. To implement the foregoing functions, hardware structures and/or software modules corresponding to the functions are included. A person skilled in the art should easily be aware that, in combination with the examples described in the embodiments disclosed in this specification, units and algorithm operations may be implemented by hardware or a combination of hardware and computer software in this application. Whether a function is performed by hardware or hardware driven by computer software depends on a particular application and design constraints of the technical solutions. A person skilled in the art may use different methods to implement the described functions for each particular application, but it should not be considered that the implementation goes beyond the scope of this application.

In the embodiments of this application, the wavelength selective switch may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that module division in the embodiments of this application is an example and is merely logical function division. During actual implementation, there may be another division manner.

A person of ordinary skill in the art may understand that all or some of the operations of the foregoing embodiments may be implemented by a program instructing related hardware. The program may be stored in a computer-readable storage medium. The storage medium may be a read-only memory, a random access memory, or the like. A processing unit or processor may be a central processing unit, a general-purpose processor, an application-specific integrated circuit (application-specific integrated circuit, ASIC), a microprocessor (digital signal processor, DSP), a field programmable gate array (field programmable gate array, FPGA) or another programmable logic component, a transistor logic component, a hardware component, or any combination thereof.

The terms "first", "then", and "finally" in the specification and claims of the embodiments of this application and the accompanying drawings are not intended to describe a particular sequence. It should be understood that the data termed in such a way is interchangeable in proper circumstances so that the embodiments described herein can be implemented in another order than the order illustrated or described herein. Moreover, the term "include" or "contain" and any other variants mean to cover the non-exclusive solution, for example, a process, method, system, product, or device that includes a list of operations or units is not necessarily limited to those expressly listed operations or units, but may include other operations or units not expressly listed or inherent to such a process, method, product, or device.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another operation, and "a" or "one" does not exclude a case of a plurality of. A single processor or another single unit may implement several functions enumerated in the claims. Some measures are described in the appended claims that are different from each other, but this does not mean that these measures cannot be combined to produce a better effect. A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". Moreover, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with other hardware, or may use another distribution manner, for example, through the internet or another wired or wireless telecommunications system.

The application is described with reference to the method, the apparatus (device), and the method flowcharts and/or block diagrams in the embodiments of the application. It should be understood that computer program instructions may be used to implement each procedure and/or each block in the flowcharts and/or the block diagrams and a combination of a procedure and/or a block in the flowcharts and/or the block diagrams. These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide operations for implementing a specified function in one or more procedures in the flowcharts and/or in one or more blocks in the block diagrams.

Although the embodiments of the application are described with reference to particular features and the embodiments thereof, clearly, various modifications and combinations may be made to them without departing from the spirit and scope of the present application.

Correspondingly, the specification and accompanying drawings are merely examples of descriptions of the present application defined by the appended claims, and are considered as any of or all modifications, variations, combinations or equivalents that cover the scope of the present application. Clearly, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A method for controlling voltages of a liquid crystal on silicon (LCoS) two-dimensional array, wherein the LCoS two-dimensional array comprises a plurality of pixel sets, the plurality of pixel sets comprising a first pixel set and a second pixel set, the method comprising:
    determining a plurality of bit sequences, the plurality of bit sequences comprising a first bit sequence and a second bit sequence;
    controlling a voltage of the first pixel set by using the first bit sequence; and
    controlling a voltage of the second pixel set by using the second bit sequence, wherein the first pixel set and the second pixel set are in different phase cycles in a port direction of the LCoS two-dimensional array, the first pixel set and the second pixel set having a same phase, and duty ratios of the first bit sequence and the second bit sequence being the same.

2. The method according to claim 1, wherein the plurality of pixel sets comprise a third pixel set and a fourth pixel set, the plurality of bit sequences comprising a third bit sequence, and the method further comprising:
    controlling voltages of the third pixel set and the fourth pixel set by using the third bit sequence, wherein the third pixel set and the fourth pixel set are adjacent pixel sets in a wavelength direction of the LCoS two-dimensional array.

3. The method according to claim 2, wherein the third pixel set comprises one or more pixels, and/or the fourth pixel set comprises one or more pixels.

4. The method according to claim 2, wherein the third bit sequence is a preconfigured bit sequence, or the third bit sequence is a bit sequence generated in real time.

5. The method according to claim 1, wherein the first bit sequence and the second bit sequence include one or more complementary bits, and/or a quantity of bits of the first bit sequence and a quantity of bits of the second bit sequence are different.

6. The method according to claim 1, wherein the first pixel set comprises one or more pixels, and/or the second pixel set comprises one or more pixels.

7. The method according to claim 1, wherein the first bit sequence and the second bit sequence are preconfigured bit sequences, or the first bit sequence and the second bit sequence are bit sequences generated in real time.

8. A liquid crystal on silicon (LCoS), applied to a wavelength switch, wherein the LCoS comprises:
    a liquid crystal layer, the liquid crystal layer comprising a plurality of pixel sets, the plurality of pixel sets comprising a first pixel set and a second pixel set; and
    a drive circuit configured to: determine a plurality of bit sequences, the plurality of bit sequences comprising a first bit sequence and a second bit sequence; and control a voltage of the first pixel set by using the first bit sequence and control a voltage of the second pixel set by using the second bit sequence, wherein the first pixel set and the second pixel set are in different phase cycles in a port direction of an LCoS two-dimensional array, the first pixel set and the second pixel set having a same phase, and duty ratios of the first bit sequence and the second bit sequence being the same.

9. The LCoS according to claim 8, wherein the plurality of pixel sets comprise a third pixel set and a fourth pixel set, the plurality of bit sequences comprising a third bit sequence, and the drive circuit is further configured to:
    control voltages of the third pixel set and the fourth pixel set by using the third bit sequence, wherein the third pixel set and the fourth pixel set are adjacent pixel sets in a wavelength direction of the LCoS two-dimensional array.

10. The LCoS according to claim 9, wherein the third pixel set comprises one or more pixels, and/or the fourth pixel set comprises one or more pixels.

11. The LCoS according to claim 9, wherein
    the third bit sequence is a preconfigured bit sequence, or the third bit sequence is a bit sequence generated in real time.

12. The LCoS according to claim 8, wherein the first bit sequence and the second bit sequence include one or more complementary bits, and/or a quantity of bits of the first bit sequence and a quantity of bits of the second bit sequence are different.

13. The LCoS according to claim 8, wherein the first pixel set comprises one or more pixels, and/or the second pixel set comprises one or more pixels.

14. The LCoS according to claim 8, wherein
    the first bit sequence and the second bit sequence are preconfigured bit sequences, or the first bit sequence and the second bit sequence are bit sequences generated in real time.

15. A wavelength selective switch comprising:
    optical ports comprising at least one input port for receiving an input beam and at least one output port corresponding to the input port;
    a wavelength division multiplexing unit configured to spatially divide the input beam into a plurality of wavelength components; and
    a liquid crystal on silicon (LCoS) configured to perform optical output on the plurality of wavelength components in a port direction, the LCoS comprising:

a liquid crystal layer, the liquid crystal layer comprising a plurality of pixel sets, the plurality of pixel sets comprising a first pixel set and a second pixel set; and a drive circuit configured to: determine a plurality of bit sequences, the plurality of bit sequences comprising a first bit sequence and a second bit sequence; and control a voltage of the first pixel set by using the first bit sequence and control a voltage of the second pixel set by using the second bit sequence, wherein the first pixel set and the second pixel set are in different phase cycles in a port direction of an LCoS two-dimensional array, the first pixel set and the second pixel set having a same phase, and duty ratios of the first bit sequence and the second bit sequence being the same.

16. The wavelength selective switch according to claim 15, wherein the plurality of pixel sets comprise a third pixel set and a fourth pixel set, the plurality of bit sequences comprising a third bit sequence, and the drive circuit is further configured to:

control voltages of the third pixel set and the fourth pixel set by using the third bit sequence, wherein the third pixel set and the fourth pixel set are adjacent pixel sets in a wavelength direction of the LCoS two-dimensional array.

17. The wavelength selective switch according to claim 16, wherein the third pixel set comprises one or more pixels, and/or the fourth pixel set comprises one or more pixels.

18. The wavelength selective switch according to claim 15, wherein the first bit sequence and the second bit sequence have one or more complementary bits, and/or a quantity of bits of the first bit sequence and a quantity of bits of the second bit sequence are different.

19. The wavelength selective switch according to claim 15, wherein the first pixel set comprises one or more pixels, and/or the second pixel set comprises one or more pixels.

20. A device comprising:

a wavelength crossing module comprising one or more wavelength selective switches configured to implement wavelength selection, wherein a wavelength selective switch comprises:

optical ports comprising at least one input port for receiving an input beam and at least one output port corresponding to the input port;

a wavelength division multiplexing unit configured to spatially divide the input beam into a plurality of wavelength components; and a liquid crystal on silicon (LCoS) configured to perform optical output on the plurality of wavelength components in a port direction, the LCoS comprising:

a liquid crystal layer, the liquid crystal layer comprising a plurality of pixel sets, the plurality of pixel sets comprising a first pixel set and a second pixel set; and a drive circuit configured to: determine a plurality of bit sequences, the plurality of bit sequences comprising a first bit sequence and a second bit sequence; and control a voltage of the first pixel set by using the first bit sequence and control a voltage of the second pixel set by using the second bit sequence, wherein the first pixel set and the second pixel set are in different phase cycles in a port direction of an LCoS two-dimensional array, the first pixel set and the second pixel set having a same phase, and duty ratios of the first bit sequence and the second bit sequence being the same.

* * * * *